United States Patent [19]

Riley et al.

[11] 4,444,533
[45] Apr. 24, 1984

[54] METHODS AND APPARATUS FOR MACHINING CRANKSHAFTS

[75] Inventors: Kenneth E. Riley, Sterling Heights; Carl Micek, Dearborn, both of Mich.

[73] Assignee: Saginaw Machine Systems, Inc., Troy, Mich.

[21] Appl. No.: 314,995

[22] Filed: Oct. 26, 1981

[51] Int. Cl.³ .......................... B23B 5/22; B23C 1/18
[52] U.S. Cl. ..................................... 409/132; 409/200
[58] Field of Search ................ 409/131, 132, 199, 200

[56] References Cited

U.S. PATENT DOCUMENTS 3,548,172 12/1970 Centner et al. ......................... 408/3
4,305,689 12/1981 Yamade et al. .................. 409/200 X

*Primary Examiner*—Z. R. Bilinsky
*Attorney, Agent, or Firm*—Learman & McCulloch

[57] ABSTRACT

Method and apparatus for milling pins on a crankshaft by rotating the crankshaft through one complete revolution about its main axis while maintaining a rotating milling cutter in tangential contact with the pin at a fixed radius from the pin axis in a manner such as to cause the cutter to mill chips of a predetermined uniform size throughout the complete revolution of the crankshaft.

7 Claims, 11 Drawing Figures

METHODS AND APPARATUS FOR MACHINING CRANKSHAFTS

BACKGROUND OF THE INVENTION

Crankshafts for internal combustion engines must have their crank pins finished to a high degree of precision. Because of the peculiar shape and geometry of the crankshaft, machining of the crank pins to their finished diameter is a complex operation, and many specialized machines have been devised for this purpose. While this art has been extensively developed, the nature of the machining operation and the paramount requirement for an accurately and precisely finished product frequently require design compromises which achieve accuracy at the expense of production time or tool life.

One type of crankshaft pin milling machine in present-day use employs an internal milling cutter. The cutter is mounted for rotation and for vertical reciprocation in a cutter carrier which may be axially positioned on the ways of a machine in which the crankshaft to be finished is chucked within the crankshaft cutter. The cutter is axially positioned with its teeth aligned with a crank pin to be finished and is then moved vertically, with the cutter being driven in rotation, until the teeth contact and machine a point on the periphery of the pin to its desired final diameter. The crankshaft is then rotated slowly about its main axis while at the same time the cutter is moved vertically to maintain the cutter teeth in tangential contact with the pin periphery at a fixed radial distance from the pin axis corresponding to the desired finished radius of the pin. Upon completion of one revolution of the crankshaft about its main axis, the pin surface has been milled to the desired finished radius.

For reasons which will be discussed more fully below, the angular increment of pin surface machined by the foregoing technique does not have a constant or linear relationship to a given angular increment of rotation of the crankshaft about its main axis. In fact, depending upon the cutter diameter and the dimensions of the crankshaft being machined, the geometry of the system is such that the amount of metal machined from the pin during a ten degree advance of the crankshaft in rotation about its main axis at one point in its rotary cycle may be three or more times as great as the amount of metal machined from the pin during a ten degree rotation of the crankshaft at some other point in its cycle of revolution.

While the foregoing problem has been recognized in the industry, the prior art does not disclose any specific practical solution. In an effort to achieve a maximum production rate, the crankshaft is driven at a rate of rotation such that, during those portions of the cycle where the maximum amount of metal is being removed, the cutter teeth are overloaded with a consequent reduction in tool life.

SUMMARY OF THE INVENTION

In accordance with the present invention, the crank pins of a crankshaft are milled to their finished diameter by means of a rotating internal milling cutter which is vertically reciprocated in tangential contact with an imaginary cylindrical surface constituting the finished surface of the pin while the crankshaft is driven in rotation about its main axis. The rate of rotation of the crankshaft about its main axis is continuously varied as the crankshaft is rotated through a single complete revolution in a fashion such that each cutter tooth removes a chip whose size is maintained substantially constant throughout the full revolution of the crankshaft.

The rate of rotation of the crankshaft, as well as the rate of vertical reciprocation of the cutter carrier, may be varied by a cam controlled drive system or by a CNC system which has been programmed in terms of the crankshaft and cutter dimensions to maintain the desired variable rate of rotation of the crankshaft.

Other objects and features of the invention will become apparent by reference to the following specification and to the drawings.

IN THE DRAWINGS

Figure 1:
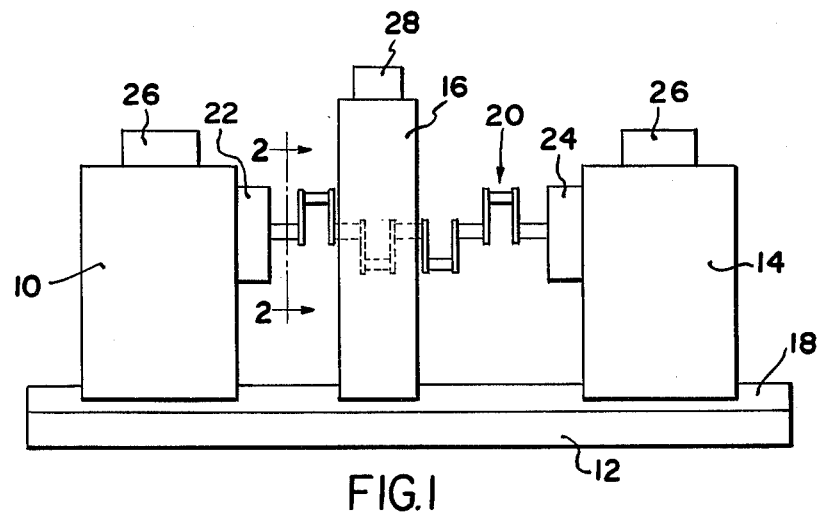
FIG. 1 is a schematic side elevational view of a machine embodying the present invention.

Referring first of all of FIG. 1, there is shown a schematic diagram of a crankshaft milling machine in which a main housing 10 is mounted at one end of a bed 12. A tail housing 14 and a cutter carrier 16 are mounted upon ways 18 fixedly mounted upon bed 12 in a manner such that housing 14 and cutter carrier 16 may be positioned at selected locations longitudinally of bed 12. In the usual case, power driven members may be employed for longitudinally positioning tail housing 14 and carrier 16 dependent on the crankshaft being machined, and in the usual case, some means, not shown, are provided for fixedly locking the elements 14 and 16 in their longitudinally adjusted positions. A crankshaft 20, whose crank pins are to be milled by an internal milling cutter carried by cutter carrier 16 is coaxially supported between a drive chuck 22 on main housing 10 and a drive chuck 24 on tailstock housing 14. Drive chucks 22 and 24 are driven in rotation by variable speed DC servo drive motors and drive trains mounted in housings 10 and 14 which are in turn controlled by synchronized controllers schematically illustrated at 26. A second pair of controllers which act to control vertical movement of the internal milling cutter is schematically illustrated at 28.

Figure 2:
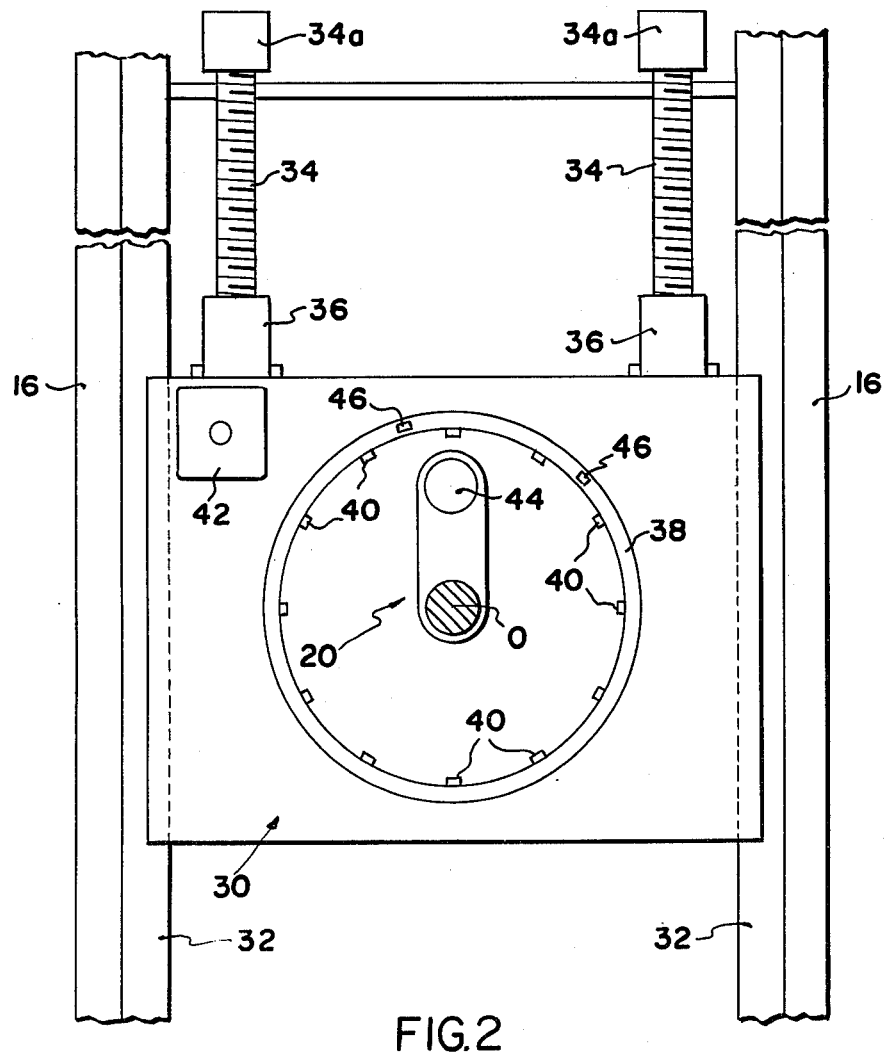
FIG. 2 is an enlarged, sectional view, taken on the line 2—2 of FIG. 1, with certain parts broken away and omitted.

Referring now to FIG. 2, it is seen that cutter carrier 16 includes a cutter head 30 which is mounted within carrier 16 for vertical sliding movement within carrier 16 along ways or guides 32. Cutter head 30 is shifted vertically along ways 32, as by rotary ball screws 34, engaging with ball nuts 36 suitably fastened at a fixed location on the frame of cutter head 30. The ball screws 34 are arranged to be driven in rotation by suitable variable speed DC servo motors schematically indicated at 28a in FIG. 3, which couple to ball screws 34 as with couplings 34a. An internal milling cutter 38 having a plurality of cutting teeth 40 uniformly disposed around its inner periphery is rotatably mounted within cutter carrier 30 and arranged to be driven in rotation as by a drive shaft and motor assembly 42 mounted on head 30 and coupled to cutter 38 by a suitable drive train of the type well-known to those skilled in the art, and hence not illustrated.

In FIG. 2, cutter head 30 is vertically positioned within cutter carrier 16 so that the cutter axis is coincident with the main axis 0 of a crankshaft 20 chucked as shown in FIG. 1. It will be noted that the internal diameter of the cutter is large enough so that when the cutter axis is coaxial with the main axis 0 of crankshaft 20, the crankshaft can pass freely through the cutter. This permits cutter carrier 16 to be axially positioned relative to the crankshaft by longitudinal movement along ways 18 (FIG. 1), as described previously, to locate the cutter in operative relationship with the desired pin 44 of the crankshaft which is to be machined.

As is well-known to those skilled in the art, the teeth 40 may be disposed in multiple rows (i.e., three), which together correspond to the axial length of pin 44 or the axial extent of the cutter teeth 40 may correspond to the axial length of the pin 44. It is also conventional to provide such an internal milling cutter with teeth such as 46 on its opposite sides so that the opposed cheeks of the crank arm may be milled as the cutter is moved from the position shown in FIG. 2 in a so-called "plunge" stroke into cutting relationship with the pin 44.

The structural details of the machine described thus far, such as the chucks, cutter carrier positioning means, drive trains, etc. are conventional and well-known to those skilled in the art.

Figure 3:
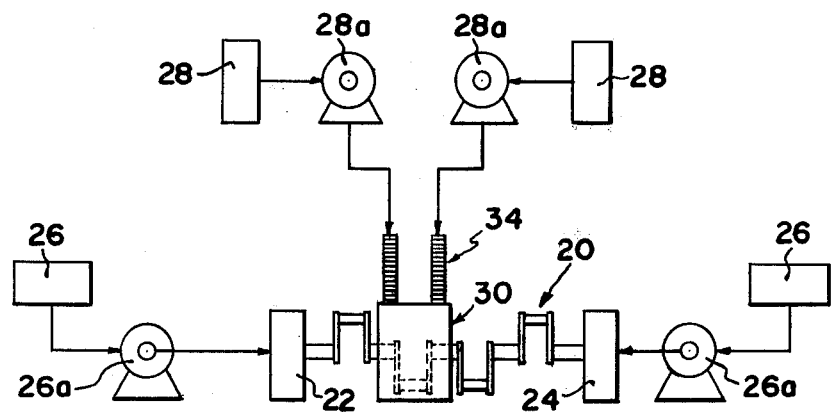
FIG. 3 is a diagrammatic sketch of the control system of the machine of FIG. 1.

In FIG. 3, a schematic diagram of a typical control system for the machine of FIG. 1 is shown. Chucks 22 and 24 are each driven by a variable speed motor 26a whose rate of rotation is varied by the schematically illustrated motor controller 26. The variable speed ball screws 34 which raise and lower cutter head 30 likewise are each driven by a reversible variable speed motor 28a whose rate of rotation is varied by a motor controller 28. Motors 28a may also be mechanically coupled if desired, as may motors 26a.

The motor controllers 26 and 28 may take the form of any of several well-known types of controllers—E.G., CNC systems, cam controlled systems, etc.—which have the capability of continuously varying the speed of the controlled motor (26a or 28a) with a reasonable degree of precision. As will be developed below, the specific rates and the pattern in which the rates must be varied through the cycle are dependent upon the specific dimensions of the crankshaft being milled. Thus, a CNC or tape controlled system would be preferable to a cam controlled system in the case where relatively short runs of different models of crankshafts are produced, whereas a cam controlled system might be preferable where relatively long production runs of a single crankshaft model is involved.

Figure 4:
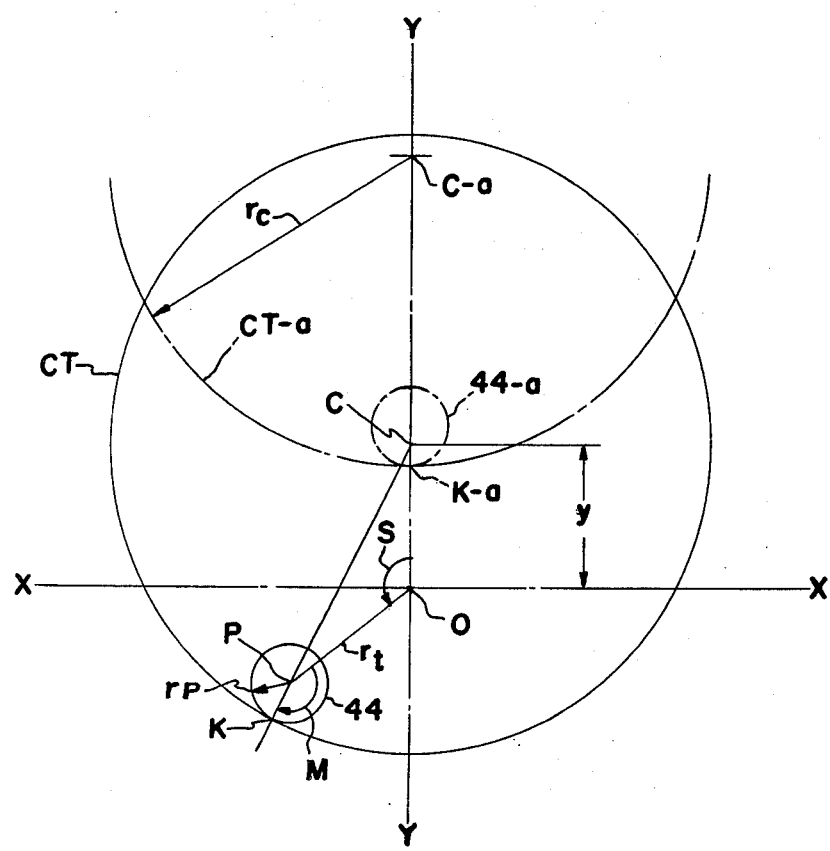
FIG. 4 is a schematic diagram illustrative of the operation of the machine of FIG. 1.

Details of the pin milling operation are best understood by reference to the schematic diagram of FIG. 4 which schematically illustrates the relationship between the cutter and a pin 44 being milled by the cutter at a randomly selected stage of the milling cycle.

As described above, during the milling cycle, the crankshaft is rotated from a start position through a complete revolution of 360° about its main axis. During this revolution of the crankshaft, the internal milling cutter is maintained in tangential contact with an imaginary cylindrical surface constituting the finished surface of the pin by vertically moving the cutter in accordance with the motion of the pin as it is rotated about the main axis of the crankshaft.

In FIG. 4, the pin 44 being milled is illustrated at one point of its revolution about the main axis 0 of the crankshaft. For purposes of illustration, X and Y axes having their origin conincident with the main axis 0 of the crankshaft have been indicated, the main axis 0 of the crankshaft corresponding to "z" axis of a three dimensional cartesian coordinate system.

At the particular instant in the milling cycle shown in FIG. 4, the axis of the internal milling cutter is located at point C and the cutter teeth are being driven in rotation along a circular path CT which, in FIG. 4, tangentially engages the periphery of pin 44 at point K, which lies on a straight radial line extending from the cutter axis C through the axis P of pin 44.

At the stage in the cycle schematically represented in FIG. 4, the pin 44 being machined has been advanced from a start position indicated in broken lines in FIG. 4 at 44-a by rotation of the crankshaft about its main axis 0 through an angle S.

The position of the cutter relative to the pin at the start position is also indicated in broken line at CT-a and it will be noted that in order to maintain the desired tangential contact between the cutter and the pin, rotation of the pin 44 about the main crankshaft axis 0 through the angle S has required the cutter rotary axis to shift along the y axis from its start position indicated at C-a to the location C in FIG. 4.

It will further be observed that when the cutter and pin were in the start position shown in broken lines in FIG. 4, the point of contact K-a between the cutter and pin is located on that point of the pin lying on a line connecting the pin axis to the main axis of the crankshaft. When the pin has been rotated to the position shown in full line in FIG. 4, the point of contact K between the cutter and pin has been angularly displaced from its start relationship by an angle M measured around the pin axis P. From a consideration of FIG. 4, the mathematical expression for the angle M subtended by that portion of the periphery of the pin which has been machined to its finished dimension in terms of the angle S through which the pin has been rotated from its start position is:

$$M = S + \arcsin \frac{(r_t \sin S)}{r_c - r_p} \tag{1}$$

where $r_t$ is the eccentricity of the crankshaft (radial distance between the main axis 0 of the crankshaft and the pin axis P), $r_c$ is the cutter radius, and $r_p$ is the desired finished radius of the pin being machined.

Similarly, the cutter axis elevation y at any stage of the cycle can be expressed in terms of the crankshaft angle S:

$$y = r_t \cos S + [(r_c - r_p)^2 - (r_t \sin S)^2]^{\frac{1}{2}} \tag{2}$$

From an inspection of the first of the above equations, it is apparent that the angular extent of the pin which has been machined M does not bear a linear relationship to the angle S through which the pin has been rotated about the crankshaft since the start of the pin finishing operation. This nonlinear relationship is illustrated in the schematic diagrams of FIGS. 5–9 which show the relationship between the cutter and pin as the pin is rotated in 90° increments about the crankshaft axis 0 through 360° from a start position shown in FIG. 5 to the finished position shown in FIG. 9.

Figure 5:
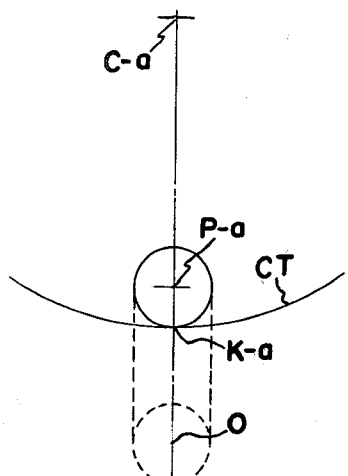
FIGS. 5-9 are schematic diagrams showing the sequence of operation of the machine.

Referring first to FIG. 5, the relationship between the cutter position and pin position at the start of the pin surface finishing operation is schematically indicated. In the start position, the main crankshaft axis 0, the pin axis P and the cutter axis C are vertically aligned with each other, the cutter axis location being indicated at C-a and the pin axis being illustrated at P-a, the subscript a being employed since these points will move during the finishing operation while the main crankshaft axis 0 remains fixed. The pin axis P-a when in the start position shown in FIG. 5 is at the 12:00 o'clock position relative to the main crankshaft axis 0, while the teeth of the cutter will follow the path indicated at CT. At this particular phase of the operation, the point of contact between the cutter teeth and pin surface K-a lies on the line connecting the crankshaft axis 0 with the pin axis P-a.

Figure 6:
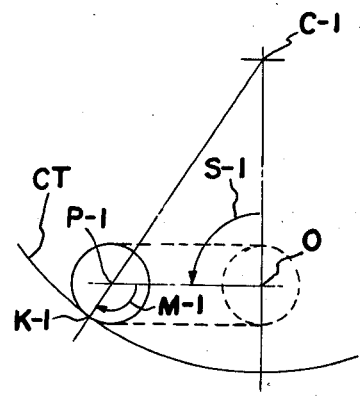

In FIG. 6, the crankshaft has been rotated 90° in a counterclockwise direction from the position shown in FIG. 5, this action requiring the cutter axis to be vertically lowered relative to the crankshaft axis 0, to maintain the desired contact with the pin and in FIG. 6 the cutter axis is located at C-1. The point of tangential engagement between the cutter teeth path CT and the pin surface is indicated at K-1. In FIG. 6, it will be noted that while the pin has been rotated through an angle S-1 of only 90° about the main crankshaft axis 0, the point of contact K-1 between the cutter and pin has been displaced through an angle M-1 which is substantially greater than 90°.

Figure 7:
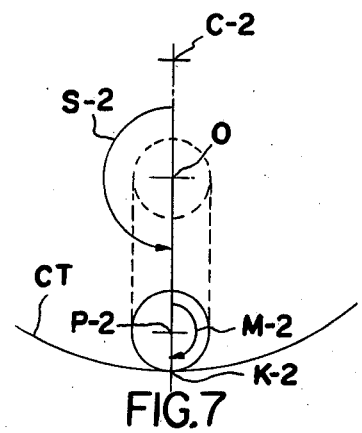

Referring now to FIG. 7, the relationship between cutter and pin is illustrated at the point in the cycle where the pin has been rotated through an angle S-2 of 180° from the original start position shown in FIG. 5. The angle M-2, which represents the angular extent of the pin surface which has been machined to this stage is also 180°.

Figure 8:
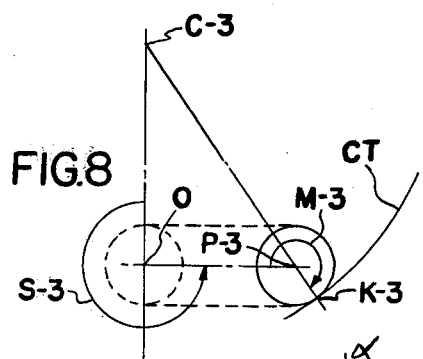

Referring now to FIG. 8, the relationship of the cutter and pin when the pin has been rotated through an angle S-3 of 270° from its start position is shown. Note that the angle M-3 which has been machined to this point is substantially less than 270°.

Figure 9:
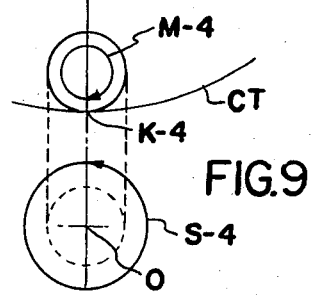

Finally, as shown in FIG. 9, when the pin has been rotated about the main crankshaft axis 0 through a complete revolution S-4 of 360°, the entire surface of the pin has been machined by the cutter, the machined angle M-4 as shown in FIG. 9 being likewise 360°.

If it is assumed, for example, that the machined angle M-1 of the pin of FIG. 6 is 135°, then rotation of the pin from the position shown in FIG. 6 to the 180° position shown in FIG. 7 will find only an additional 45° of the pin surface being machined. To put this fact into practical terms, during the first 90° of rotation of the pin from the start position of FIG. 5 to the 90° position of FIG. 6, three times as much metal must be removed from the pin as will be removed during the next 90° of rotation of the pin about the crankshaft axis between the positions shown in FIGS. 6 and 7. A similar result in the reverse sequence occurs during the remaining half revolution of the crankshaft. During the 90° of rotation of the pin about the crankshaft axis between the positions shown in FIGS. 7 and 8, only an additional 45° of the pin circumference is machined by the cutter, while during the final quadrant of pin rotation between the positions of FIGS. 8 and 9, 135° of the pin circumference is traversed by the cutter.

While the foregoing example considers the milling operation in terms of 90° increments of rotation of the crankshaft, it is believed apparent from the equation set forth above that the relationship between the angular extent of the pin surface machined for a given increment of crankshaft rotation (dM/dS) is in fact continuously variable regardless of how small the increment of crankshaft rotation (dS) becomes.

During the milling operation, the internal milling cutter is driven at a constant relatively high rate of rotation. The individual teeth on the cutter are uniformly spaced from each other about the cutter axis and hence a cutter tooth will pass through the metal pin surface at essentially uniformly spaced time intervals of relatively small duration, the passage of each tooth removing a single chip of metal from the pin. The essential limitation on the milling operation, we have discovered, is the maximum thickness of a chip which can be efficiently removed from the pin by the passage of one cutter tooth through the metal of the pin. If this practical limitation is exceeded, the useful life of the cutter tooth is drastically reduced and excess vibration is occasioned by the rapid periodic overloading of the cutter drive system as each successive tooth, in effect, attempts to bite off more than it can chew.

Figure 10:
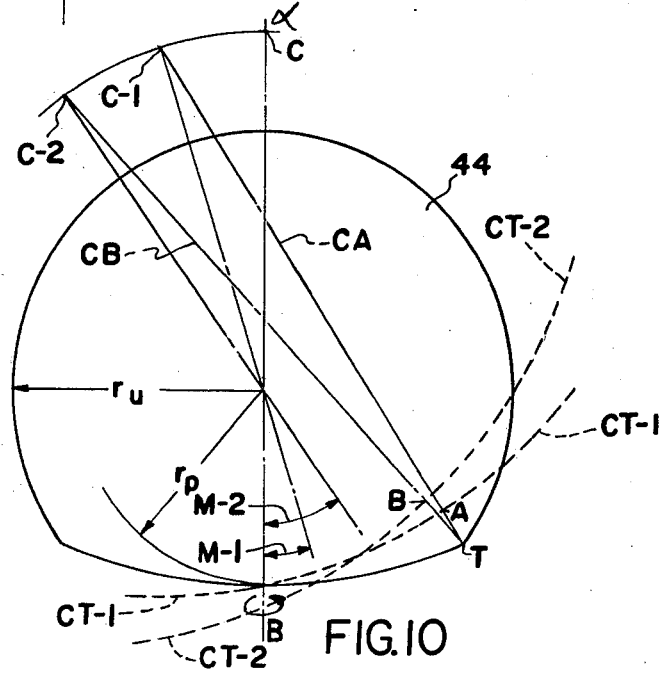
FIG. 10 is a diagram indicating the manner of determining the chip thickness.

The thickness of a chip which a cutter tooth will remove can be readily calculated where the angular movement of the pin relative to the cutter between the passage of successive teeth through the pin is known, together with the difference between the unfinished and finished radii of the pin. Referring to FIG. 10, it is seen that the thickness of the chip to be removed will vary in accordance with the angle of rotation of the pin between successive passes of the cutter teeth. In FIG. 10, a pin 44 which is to be finished to a finished radius $r_p$, and having an unfinished radius of $r_u$, is shown in a situation corresponding to that of FIG. 5 where the cutter has milled the unfinished pin to its finished radius $r_p$ at the 6:00 o'clock position of the pin. The proportions of FIG. 10 have been greatly exaggerated for the purpose of illustration.

Assume that before the passage of the next cutter tooth, the pin 44 has been rotated relative to the cutter so that the path of the cutter teeth relative to the pin follows the line CT-1-CT-1 in FIG. 10, this angular movement of the pin corresponding to a machined angle M-1 as indicated in FIG. 10. With the assumed rotation of the pin relative to the cutter through the angle M-1, the maximum chip thickness is represented by the line AT in FIG. 10, this being the length of a segment of a radial line CA from the cutter axis, located at C-1 which passes through the point T at the intersection of the previous cut and the unfinished surface of the pin.

If, however, the pin has been rotated through a greater angle M-2 before the passage of the next cutter tooth, the cutter tooth path would be along the arc CT-2-CT-2, and the thickness of the chip in this situation would be the dimention BT as shown in FIG. 10, the dimension BT being greater than AT.

While the chip thickness AT increases with increasing angular increments of the pin between successive passes of the teeth, this is not a linear relationship, but may be expressed as:

$$AT = [r_u^2 + (r_c - r_p)^2 - 2r_u(r_c - r_p) \cos(M + \phi)]^{\frac{1}{2}} - r_c, \quad (2a)$$

and where:

$$\phi = ARCCOS\{[r_u^2 + (r_c - r_p)^2 - r_c^2]/[2r_u(r_c - r_p)]\} \quad (2b)$$

Similarly, the cutter axis elevation y at any stage of the cycle can be expressed in terms of the crankshaft angle S:

$$y = r_t \cos S + [(r_c - r_p)^2 - (r_t \sin S)^2]^{\frac{1}{2}} \qquad (3)$$

Thus, when the maximum or most efficient thickness of chips at which the cutter can efficiently operate is known, the particular angular increment of movement of the pin relative to the cutter between successive passes of cutter teeth can easily be determined.

As developed above, the machined angle of the pin M is expressed in Equation (1) as a function of the angle S through which the pin has rotated about the crankshaft axis from the start position diagrammatically illustrated in FIG. 5. Equation (1) may be differentiated to obtain the rate of change of the machined angle of the pin M for a given incremental change of the crankshaft angle S or to obtain the differential expression for dM/dS.

To obtain the removal of a constant chip thickness with each passage of a cutter tooth through the pin, the rate of change of the machined angle M of the pin with respect to time dM/dt should equal a constant.

The desired rate of rotation of the crankshaft about its axis during the milling operation, dS/dt to achieve a constant rate of rotation of the pin about its own axis relative to the cutter may be calculated by noting that dM/dS equals dM/dt multiplied by dt/dS. Because dM/dS may be readily derived from Equation (1) and dM/dt is a calculated constant determined by the desired chip thickness, a mathematical expression for the desired dS/dt can be readily found.

The present state of the computer art and numerical positioning control systems is such that commercially available microprocessors may be readily programmed to command a numerical positioning control system 26, 28 to vary the rate of rotation of a crankshaft and to control the rate of movement of the cutter axis in vertical movement to assure a uniform rate of removal of metal from a crankshaft pin in accordance with the technique outlined above. It will be noted that the mathematical relationships between the machined pin angle M and the crankshaft angle S and the expression of the cutter axis elevation Y in terms of crankshaft angle S both include terms setting forth certain relationships between various known dimensions such as the finished pin radius $r_p$, the cutter radius $r_c$ and the crankshaft eccentricity $r_t$ which dimensions will differ between different crankshafts and different tooling set-ups. Thus, by changing the specific inputs to a microprocessor, a control system for a crankshaft milling machine is achieved in which a wide variety of crankshaft configurations may be accurately and efficiently milled simply by minor modifications in the instructions fed into the microprocessor.

While the conventional controllers 26 and 28 are separately schematically illustrated for purposes of convenience, they normally form part of an overall control panel which is supplied with the machine. Cam controlled motor controllers may also be employed to obtain the necessary control of motors 26a, 28a. Because the desires rates of motors 26a, 28a are dependent upon the crankshaft dimensions, a set of cams (or tapes) must be provided for each set of crankshaft (and cutter) dimensions.

Figure 11:
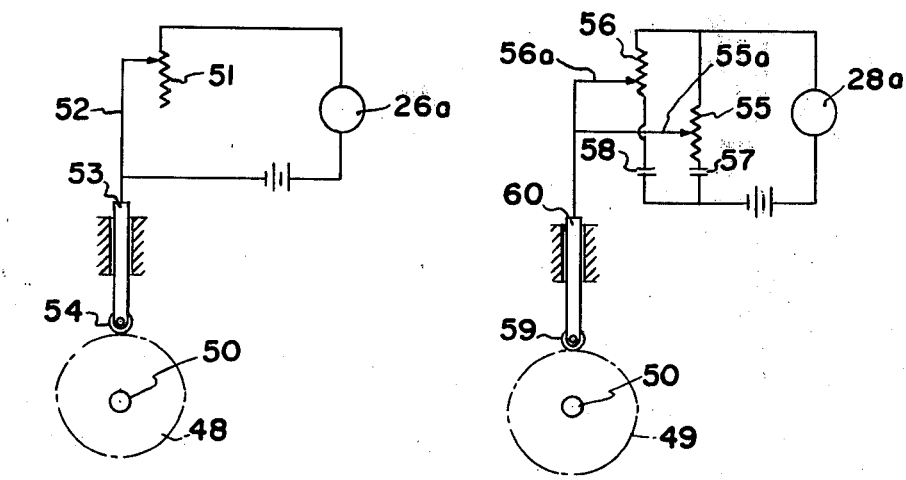
FIG. 11 is a schematic view of an alternate system for controlling movements of the crankshaft rotating chucks and the cutter slide in synchronism.

In FIG. 11, a schematic diagram illustrating what might be termed a typical cam control system is shown, wherein cams 48 and 49 mounted on a shaft 50, driven continuously by a motor (not shown), are used to drive the motors 26a and 28a respectively.

As schematically indicated, motor 26a is in circuit with a rheostat device 51 having a movable part 52 mounted on a slide 53 which, via follower roller 54, is in contact with cam 48. The speed of rotation of motor 26a is varied according to the configuration of cam 48, to achieve the variable rates of speed to which reference has been made during each revolution.

The motor 28a, for controlling slide 30, is connected in a circuit with a pair of rheostat devices 55 and 56, each of which is connected in series with relay contacts or limit switches 57 and 58, respectively. Motor 28a is a reversible motor and rheostat 55 controls it when it is moving in one direction of rotation, and rheostat 56 when it is moving in the other direction of rotation. The contacts 57 and 58 are alternately opened and closed by suitable timers of conventional nature or by actuators on shaft 50 to achieve movement of the slide 30 first in one direction and then in the other.

As in the case of cam 48, a follower roller 59 mounted on a slide 60, controls the operation of the movable elements 56a of rheostat 56 and 55a and rheostat 55. When switch 58 is open and switch 57 is closed, the motor 28a will be driven in one direction of rotation under control of the movable rheostat part 55a. When switch 57 is open and switch 58 is closed, it is the movable rheostat part 55a which controls the rate of rotation of motor 28a in the opposite direction via rheostat device 55.

Where a cam controlled system is employed, the cam surfaces are smoothly curved and a truly continuous variation of the rate of rotation of the crankshaft and the rate of movement of the cutter head results.

In an NC system, while the system can closely approach a truly continuous rate control and for practical purposes does, the rate adjustment in the final analysis is a step-by-step adjustment, although the systems can be operated in extremely minute steps. In the NC system described above, taking into consideration the response time of the mechanical portions of the various drives to an input signal, a practical limitation with presently available NC systems applied to the present invention is to have the system call for a rate adjustment at 100 millisecond time intervals. While the rate adjustment or variation achieved is thus not theoretically truly continuous, for practical purposes, in this particular operation, the difference is negligible.

For the foregoing reasons, the term "substantially continuous variation" or equivalents as employed in the following claims is to be construed as encompassing step-by-step adjustments or variations which are substantially or practically speaking a true continuous variation. The method described produces chips of uniform size with respect to length and thickness.

While two embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

We claim:

1. The method of milling at least a portion of a crankshaft pin to a finished radius $r_p$ comprising, reciprocating a rotating internal milling cutter having a plurality of uniformly spaced teeth lying at a cutting radius $r_c$ from the axis of rotation of the cutter along a straight line path normal to and intersecting the main axis of the crankshaft to maintain the cutting path of the cutter teeth in substantially tangential relationship with an imaginary cylindrical surface of radius $r_p$ centered on the pin axis while rotating the crankshaft through one complete revolution about its main axis from a predetermined start position, the pin axis being displaced from the main axis of the crankshaft by a radial distance $r_t$; said cutter radius $r_c > r_p + r_t$ driving the cutter at a constant rate of rotation and driving said crankshaft at a variable rate of rotation $$\frac{dS}{dt} = \frac{C\sqrt{(r_c - r_p)^2 - (r_t \sin S)^2}}{r_p \left[ r_t \cos S + \sqrt{(r_c - r_p)^2 - (r_t \sin S)^2} \right]}$$

where S is the angular displacement of the crankshaft from its start position and C is a constant representative of that constant rate of rotation of the pin about its pin axis such that successive teeth of the cutter engage the pin at points on the pin periphery which are spaced from each other by a selected uniform angular displacement about the pin axis and the chips removed from said pin by said teeth are of substantially uniform length and thickness throughout the complete revolutionary cycle of said crankshaft.

2. The invention defined in claim 1 wherein said cutter is reciprocated along said straight line path from a start position in movement coordinated with the angular displacement S of said crankshaft from its start position such that the linear displacement y of said cutter from its start position is at all times equal to $$r_t \cos S + [(r_c - r_p)^2 - (r_t \sin S)^2]^{\frac{1}{2}}.$$

3. In a crankshaft milling machine for milling a crankshaft pin having a pin axis radially offset from the main crankshaft axis by a distance $r_t$ to a finished cylindrical surface lying at a distance $r_p$ from the pin axis, said machine including chuck means for chucking and supporting a crankshaft for rotation about its main axis, first variable speed drive means for driving said chuck means to rotate the chucked crankshaft about its main axis, a cutter carrier, a rotary internal milling cutter mounted in said cutter carrier for rotation about its cutter axis; second drive means for driving said cutter in rotation about its axis at a selected constant rate of rotation, said cutter having a plurality of cutting teeth having tips uniformly spaced upon a circle of radius $r_c$ centered on the cutter axis, means on said cutter carrier for reciprocating the cutter along a straight line path normal to the main axis of a crankshaft supported in said chuck means to maintain said circle of radius $r_c$ in tangential contact with said cylindrical surface of radius $r_p$ on said pin as said crankshaft is rotated through a complete revolution about said main axis to cause said teeth to progressively mill the circumference of said pin to its finished radius $r_p$, and control means for controlling said first drive means to drive said crankshaft at a coordinated rate of rotation with said cutter such that said cutter teeth mill chips of substantially uniform size from said pin throughout one complete revolution of said crankshaft by said chuck means, with said control means controlling said first drive means to drive said crankshaft substantially at a rate of rotation $$\frac{dS}{dt} = \frac{C\sqrt{(r_c - r_p)^2 - (r_t \sin S)^2}}{r_p \left[ r_t \cos S + \sqrt{(r_c - r_p)^2 - (r_t \sin S)^2} \right]}$$

where S is the angular displacement of said crankshaft from the start of said one complete revolution, and C is a constant representative of that constant rate of rotation of said pin about its pin axis such that successive teeth of said cutter engage the pin at points on its periphery which are spaced from each other by a selected uniform angular displacement about the pin axis.

4. The invention defined in claim 3 wherein said means for reciprocating the cutter along said straight line path reciprocate it from a start position in movement coordinated with the angular displacement S of said crankshaft from its start position such that the linear displacement y of said cutter from its start position is at all times equal to $$r_t \cos S + [(r_c - r_p)^2 - (r_t \sin S)^2]^{\frac{1}{2}}.$$

5. The method of milling at least a portion of a crankshaft pin to a finished radius $r_p$ comprising, reciprocating an internal rotating milling cutter having a plurality of uniformly spaced teeth lying at a cutting radius $r_c$ from the axis of rotation of the cutter along a straight line path normal to and intersecting the main axis of the crankshaft to maintain the cutting path of the cutter teeth in substantially tangential relationship with an imaginary cylindrical surface of radius $r_p$ centered on the pin axis while rotating the crankshaft through one complete revolution about its main axis from a predetermined start position, the pin axis being displaced from the main axis of the crankshaft by a radial distance $r_t$; and reciprocating the cutter and driving the crankshaft and cutter at coordinated, substantially continuously varied rates of linear and rotational movement such that the chips removed from said pin by the cutter teeth are of substantially uniform size with respect to length and thickness throughout the complete revolutionary cycle of said crankshaft, said crankshaft being driven substantially at a predetermined rate of rotation $$\frac{dS}{dt} = \frac{C\sqrt{(r_c - r_p)^2 - (r_t \sin S)^2}}{r_p \left[ r_t \cos S + \sqrt{(r_c - r_p)^2 - (r_t \sin S)^2} \right]}$$

where S is the angular displacement of said crankshaft from the start of said one complete revolution, and C is a constant representative of that constant rate of rotation of said pin about its pin axis such that successive teeth of said cutter engage the pin at points on its periphery which are spaced from each other by a selected uniform angular displacement about the pin axis.

6. The invention defined in claim 5 wherein said cutter is reciprocated along said straight line path from a start position in movement coordinated with the angular displacement S of said crankshaft from its start position such that the linear displacement y of said cutter from its start position is at all times equal to $$r_t \cos S + [(r_c - r_p)^2 - (r_t \sin S)^2]^{\frac{1}{2}}.$$

7. The method of claim 5 wherein said cutter is driven at a constant rate of rotation.

* * * * *